United States Patent [19]
Fukawa

[11] Patent Number: 6,112,187
[45] Date of Patent: Aug. 29, 2000

[54] ENCRYPTION COMMUNICATION SYSTEM FOR GENERATING PASSWORDS ON THE BASIS OF START INFORMATION ON BOTH PARTIES OF COMMUNICATION

[75] Inventor: Yasurou Fukawa, Hiratuka, Japan

[73] Assignee: Any Co., Ltd., Kangawa-ken, Japan

[21] Appl. No.: 09/055,238

[22] Filed: Apr. 6, 1998

[30] Foreign Application Priority Data

May 20, 1997 [JP] Japan ..................................... 9-129405

[51] Int. Cl.[7] .................................................. H03M 7/00
[52] U.S. Cl. ............................. 705/18; 713/182; 713/184
[58] Field of Search .................................... 713/183, 182, 713/184; 380/255, 261

[56] References Cited

U.S. PATENT DOCUMENTS 5,623,637    4/1997   Jones et al. ............................. 711/164

Primary Examiner—Thomas R. Peeso
Attorney, Agent, or Firm—Birch, Stewart, Kolasch & Birch, LLP

[57] ABSTRACT

An encryption communication system including a host and a data terminal card device is disclosed. The host includes a start information generation program circuit for generating password generation start information which has not been used in the past. When the data terminal card device is connected to the host for communication, a password generation program circuit included in the card device generates a password in accordance with the start information received from the host. The card device sends the generated password to the host for certification. If the received password is coincident with a password generated in the host, the host certifies the received password and allows communication to be held. An encryption circuit also included in the card device controls a plurality of different encryption programs in a sophisticated way so as to execute time-varying irregular control, thereby generating encrypted data.

13 Claims, 16 Drawing Sheets

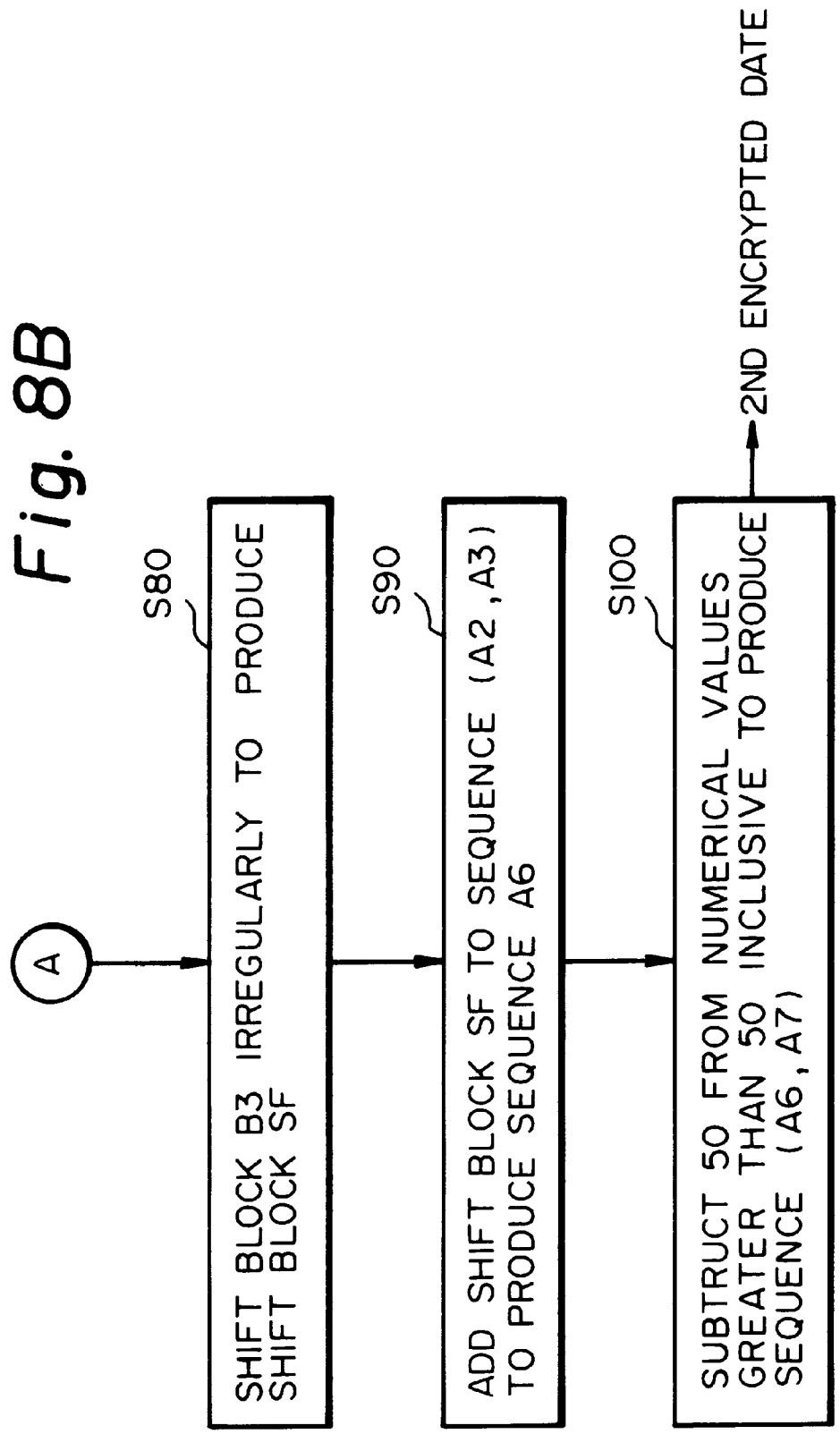

| Fig. 9A | Fig. 9B |

| CHARACTER | NUMERICAL VALUE | CHARACTER | NUMERICAL VALUE |
|---|---|---|---|
| 0 | 00 | 5 | 05 |
| 1 | 01 | 6 | 06 |
| 2 | 02 | 7 | 07 |
| 3 | 03 | 8 | 08 |
| 4 | 04 | 9 | 09 |
| SA | 20 | TA | 25 |
| SHI | 21 | CHI | 26 |
| SU | 22 | TSU | 27 |
| SE | 23 | TE | 28 |
| SO | 24 | TO | 29 |
| MA | 40 | YA | 45 |
| MI | 41 | YU | 46 |
| MU | 42 | YO | 47 |
| ME | 43 | | |
| MO | 44 | | |

Fig. 9B

| CHARACTER | NUMERICAL VALUE | CHARACTER | NUMERICAL VALUE |
|---|---|---|---|
| A | 10 | KA | 15 |
| I | 11 | KI | 16 |
| U | 12 | KU | 17 |
| E | 13 | KE | 18 |
| O | 14 | KO | 19 |
| NA | 30 | HA | 35 |
| NI | 31 | HI | 36 |
| NU | 32 | HU | 37 |
| NE | 33 | HE | 38 |
| NO | 34 | HO | 39 |
| RA | 48 | WA | 53 |
| RI | 49 | WO | 54 |
| RU | 50 | N | 55 |
| RE | 51 | ° | 56 |
| RO | 52 | ˋ | 57 |

Fig. 10

(a) ⎧ CONVERT TO NUMERICAL VALUES
⎨ HO  N   JI  TSU WA  SE  I   TE  N   NA  RI
⎩ 39  55  21  56  35  23  11  28  55  30  49

(b) ⎧ ADD CONSTANT 46 AS ENCRYPTION KEY
⎩ 85  101 67  102 81  69  57  74  101 76  95

(c) ⎧ SUBTRACT 50 TO LIMIT THE NUMBER OF DIGITS TO 2
⎩ 35  51  17  52  31  19  7   24  51  26  45

ORIGINAL NUMERICAL VALUES
(a) 39  55  21  56  35  23  11  28  55  30  49
    39  55  21   SHIFT AND ADD, 3 NUMERICAL VALUES
                 AT A TIME (c) 35  51  17  52  31  19  7   24  51  26  45
BLOCK NUMERICAL VALUES
    39  55  21  39  55  21  39  55  21  39  55

(d) ⎧ BLOCK NUMERICAL VALUES ADDED
⎩ 74  106 38  91  86  40  46  79  72  65  100

(e) ⎧ ENCRYPTED VALUES GIVEN BY SUBTRACTION OF 50
⎩ 24  56  38  41  36  40  46  29  22  15  50

Fig.11

(a) SHIFT 1 BLOCK IN 1 SEC AND ADD
    35  51  17  52  31  19  7  24  51  26  45

(b) 21  39  55  39  55  21  39  55  21  39  55

(c) SUMS
    56  90  72  91  86  40  46  79  72  95  100

(d) ENCRYPTED VALUES GIVEN BY SUBTRACTION OF 50
    6  40  22  41  36  40  29  22  45  50

(e) SHIFT N BLOCK IN N SEC AND ADD
    35  51  17  52  31  19  7  24  51  26  45
    N---------N  39  55  21  39  55  21  39

(f) SUMS
    XN--------ZN  70  74  28  63  106  47  84

(g) ENCRYPTED VALUES GIVEN BY SUBTRACTION OF 50
    XN--------ZN  20  24  28  13  56  47  34

Fig. 12

1ST COMPUTER

| TIME | ENCRYPTED DATA |
|------|----------------|
| N1   | 0100110110     |
| N2   | 0100110111     |
| N3   | 0100111111     |
| N4   | 0100000001     |
| N5   | 0101010010     |

2ND COMPUTER

| TIME | ENCRYPTED DATA |
|------|----------------|
| N1   | 0100110110     |
| N2   | 0100110111     |
| N3   | 0100111111     |
| N4   | 0100000001     |
| N5   | 0101010010     |

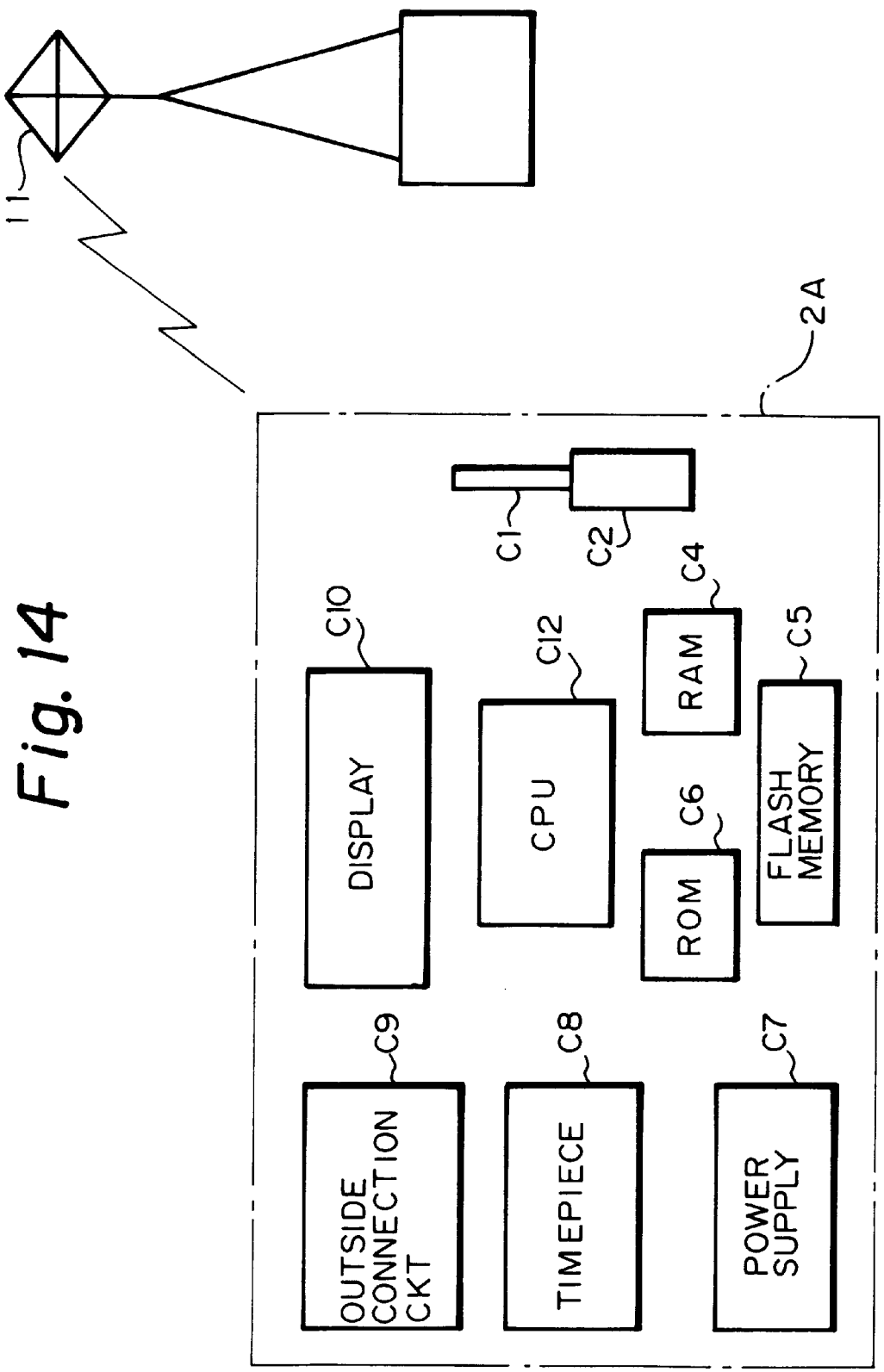

ENCRYPTION COMMUNICATION SYSTEM FOR GENERATING PASSWORDS ON THE BASIS OF START INFORMATION ON BOTH PARTIES OF COMMUNICATION

BACKGROUND OF THE INVENTION

1. Field of the Invention

The present invention relates to an encryption communication system and, more particularly, to an encryption communication device capable of improving the generation of a password and reducing the complexity of encryption.

2. Description of the Background Art

Various kinds of encryption systems have recently been put to practical use for the security of communication and data. The encryption systems include a DES (Data Encryption Standard) system and an RSA (Rivest, Shamir and Adleman) public key cryptosystem. The DES system is a public key cryptosystem of encryption algorithm publication type, i.e., the combination of positional shift and character replacement. The RSA public key cryptosystem is not feasible for the encryption of mass data because of the huge amount of calculations. The RSA system is often used for the certification and the sharing of a key between two parties prior to secret communication.

Today, the forgery of various cards including prepaid cards and telephone cards is a of social problems needing urgent remedy. Also, the problem with computer communication is that unauthorized persons often steal passwords with the intention of hacking into computers and a communication network. Although some degree of encryption is effected with existing computer systems and communication systems for the security purpose, not all the systems and terminals are provided with an advanced encryption scheme. Moreover, advanced encryption is not practicable without resorting to a sophisticated program and a sophisticated circuit arrangement. It is therefore difficult to effect advanced encryption with miniature data terminals and devices.

IC (Integrated Circuit) cards are now replacing magnetic cards due to large storage capacity available therewith. With IC cards, it is possible to totally manage various kinds of information necessary for daily life, e.g., financial information and private information. Further, there has been proposed to apply IC cards to telephone cards, prepaid cards for trains, and prepaid cards for pachinko and other games. Encryption is essential even with such IC cards in order to secure the above information and to protect the IC cards from eavesdroppers when connected to a host for communication. In addition, this encryption must be done with a miniature arrangement.

Some different encryption schemes are practiced with up-to-date computer communication systems for the communication and data security purpose, and each is implemented by a sophisticated combination of numerical values and sentences. However, even the numerical values and sentences combined in a sophisticated way might be decrypted by use of a large capacity, high speed computer if static (uniform and simple) numerical values and sentences were combined.

SUMMARY OF THE INVENTION

It is therefore an object of the present invention to provide a system and a device for encryption communication capable of ensuring, when data are to be sent from a computer connected to a computer network or a data card terminal, the advanced security of data, protecting the data card terminal from illicit use, and protecting encrypted data from illicit decryption.

In accordance with the present invention, an encryption communication system includes a first communication device for producing significant information for generating a different password at each time of connection for communication, and a second communication device for generating, on receiving the information from the first communication device, a password based on the information, and sending the password to the first communication device. The first communication device includes an information producing circuit for producing the information on the basis of an irregular signal. A first password generating circuit generates the password based on the information by using a password generation program. A decision circuit determines whether or not the password received from the second communication device and the password output from the first password generating circuit are coincident, and outputs a coincidence signal if the two passwords are coincident or outputting a noncoincidence signal if they are not coincident. A first communication starting circuit starts encryption communication with the second communication device in response to the coincidence signal. The second communication device includes a second password generating circuit for generating, based on the information received from the first communication device, the password by using the same password generation program as the first password generating circuit. A second communication starting circuit starts encryption communication with the first communication device in response to the coincidence signal.

Also, in accordance with the present invention, an encryption communication system includes a first encryption communication device, and a second encryption communication device. The first communication device includes an information producing circuit for producing, based on an irregular signal, significant information for generating a password which varies at each time of connection for communication. A first password generating circuit generates, based on the information, a password by using a password generation program. A decision circuit determines whether or not a password received from the second encryption communication device and the password output from the first password generating circuit are coincident, and outputs a coincidence signal if the passwords are coincident or outputting a noncoincidence signal if the passwords are not coincident. A first communication starting circuit starts encryption communication with the second encryption communication device in response to the coincidence signal. The irregular signal is at least one of a noise signal and a weather signal. The first password generating circuit digitizes the irregular signal, generates random number data based on the resulting digital data, determines whether or not the random number data has been used in the past, and outputs the random number data, if not used in the past, as the information. The second encryption communication device includes a second password generating circuit for generating, on receiving the information from the first encryption communication device, the password by using the same password generation program as the first password generating circuit. A second communication starting circuit starts encryption communication with the first encryption communication device in response to the coincidence signal.

Further, in accordance with the present invention, an encryption communication device includes an encrypting circuit including a plurality of different encryption programs, a random number generation program for encryption, and a timepiece for generating a time signal or a timing signal. The encrypting circuit selects, based on the time signal or the timing signal designated by the random number generation program for encryption, one of the encryption programs at an irregular time interval to thereby encrypt plain text data and outputs the resulting encrypted data while selectively varying the encryption program selected.

Moreover, in accordance with the present invention, in a recording medium storing a password generation control program for allowing a computer to control generation of a password, the password generation control program causes the computer to produce, based on an irregular signal, significant information for generating a password which varies at each time of connection for communication, to generate the password by using a password generation program, to determine whether or not the password and a password received from another communication device are coincident, and to output a coincidence signal if the passwords are coincident or output a noncoincidence signal if the passwords are not coincident. The password generation control program executes, in response to the coincidence signal, control for starting encryption communication with the other communication device.

BRIEF DESCRIPTION OF THE DRAWINGS

The objects and features of the present invention will become more apparent from the consideration of the following detailed description taken in conjunction with the accompanying drawings in which:

FIGS. 8A and 8B are flowcharts demonstrating a specific procedure for encrypting plain text data and particular to the embodiment;

FIG. 9 shows how FIGS. 9A and 9B are combined;

FIGS. 9A and 9B show, when combined as shown in FIG. 9, a table for converting characters to numerical values and used to execute the procedure shown in FIGS. 8A and 8B;

FIG. 10 shows numerical values for generating first encrypted data in the encryption procedure of FIGS. 8A and 8B;

FIG. 11 shows numerical values for generating second and N-th encrypted data in the encryption procedure of FIGS. 8A and 8B;

FIG. 12 shows how encrypted data are varied in a first and a second computer in unison in synchronism with the elapse of time;

FIG. 14 shows a specific configuration of a data terminal card device capable of correcting its time on the basis of a reference radio wave received from a radio wave transmitting station, and having an encrypting function and a password generating function.

DESCRIPTION OF THE PREFERRED EMBODIMENT

Figure 1:
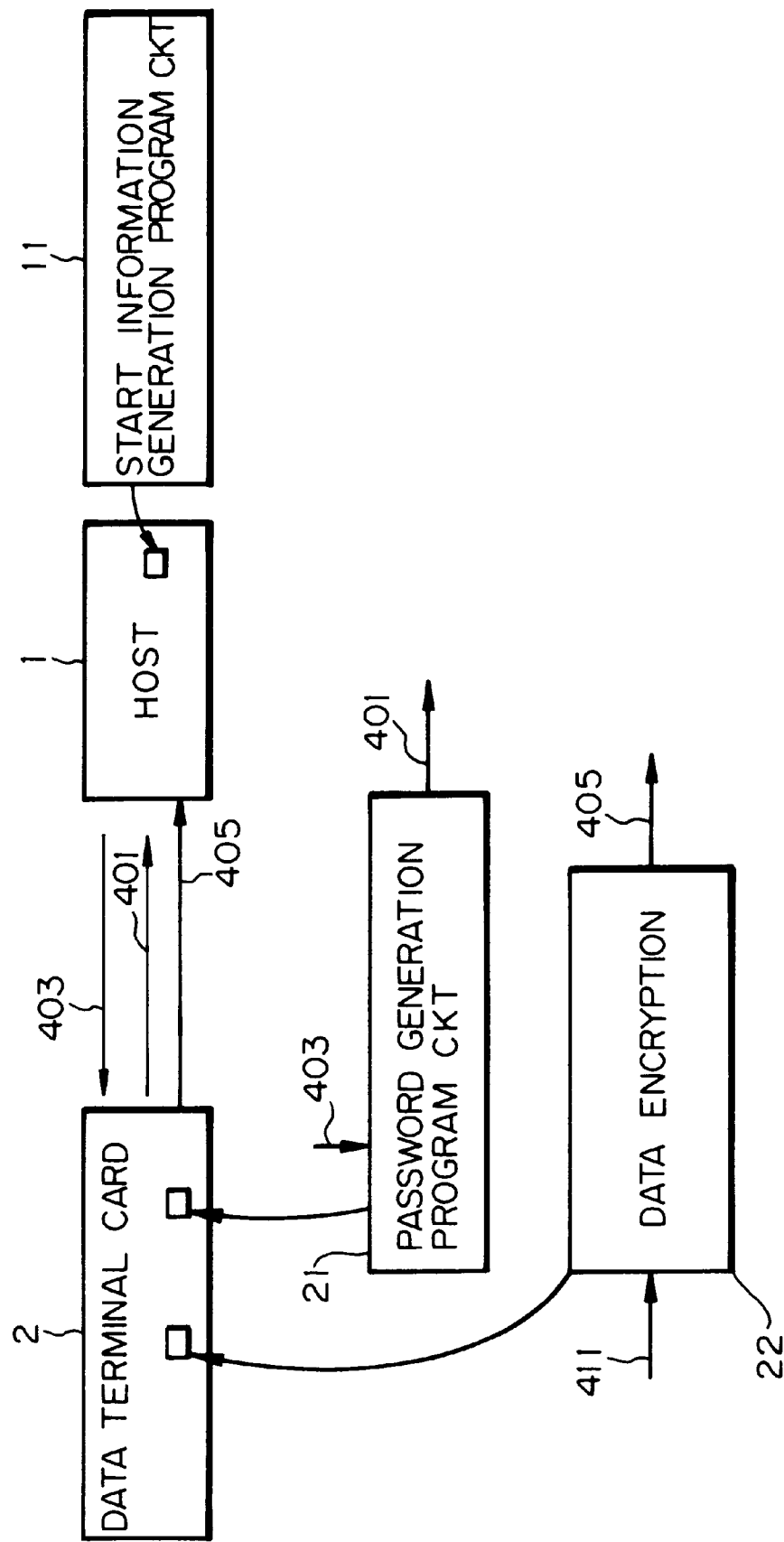
FIG. 1 is a block diagram schematically showing an encryption communication system embodying the present invention, particularly an encryption scheme between a data terminal card device and a host.

The principle of a preferred embodiment of the encryption communication system in accordance with the present invention will be described before entering into a detailed description of the embodiment. The illustrative embodiment replaces the conventional static or uniform combination of numerical values and a text (encrypted data) with an encrypting method which is dynamically varied at all times so as not to even suggest the existance of a decrypting method. This kind of method successfully discourages unauthorized persons from decrypting encrypted data. For example, in a personal computer communication, an ID (Identification) code or a password is varied without any regularity at each time of connection for communication. Further, an ID code or a password used in the past is not used again. With this configuration, the ID card and password are protected from decoding or illicit use by the third party.

A code for security is dynamically varied at all times between two computers, e.g., between a data card terminal and a data card reader or a network system. The prerequisite with such variation of the code is that the two computers be synchronized to each other at the beginning of and during encryption and decryption; otherwise, encrypted data cannot be decrypted to a plain text. It is therefore necessary that the time of the encrypting side and the time of the decrypting side be coincident. For this purpose, clocks of clock circuits are matched on the basis of a reference time. For a reference clock, of a highly accurate time signal contained in a radio wave signal being sent from a reference radio wave transmitting station or a GPS (Global Positioning System) and representative of reference time may be used.

In the embodiment to be described, when two computers (e.g., data card terminal and data card reader or two computers communicable via a network) hold data communication, they individually control encryption such that their passwords and data are encrypted and protected from eavesdropping.

An encryption coefficient, i.e., information for controlling encryption and an encryption code are varied time-serially. That is, the embodiment varies the encrypting method at all times by using a program sequence. This is contrastive to the conventional fixed or static encryption schemes.

At the beginning of communication between two computers, the start times of their programs are matched, and an encryption procedure is varied. At the same time, a decryption procedure is varied in accordance with the encryption procedure.

Numerical values for encryption are dynamically varied with the elapse of time and therefore far more difficult to decode than numerical values derived from static encryption.

The encrypting method is varied irregularly while the decoding method is matched to the varying encrypting method by using time as a key. The time interval between the consecutive variations of the encrypting method should preferably be irregular and varied on the basis of the numerical values of a random number table by way of example.

An arrangement should preferably be made so as to render the decryption timing adjustable in order to ensure decryption even when the clock is slightly deviated.

Referring to FIG. 1 of the drawings, the encryption communication system embodying the present invention includes a host 1 and a data terminal card device 2 communicable with each other. The data terminal card device (simply card device hereinafter) 2 is a telephone card, pachinko card or similar prepaid card implemented as an IC card. The host 1 may be replaced with a communication device, if desired. The host 1 and card device 2 may be connected to each other either by a radio communication system or a wired communication system. To allow the card device 2 and host 1 to hold communication using encrypted data, it is necessary for the card device 2 to send a password 401 to the host 1 first for the certification of the password. For this purpose, the card device 2 generates a password 401 and sends it to the host 1. If the host 1 certifies the password, it allows the card device 2 to hold encryption communication therewith.

The prerequisite with the illustrative embodiment is that the password must be replaced each time so as not to be stolen by the third party. In addition, it is necessary to prevent the third party from predicting a method or a mechanism used to generate the password. To meet these requirements, the illustrative embodiment generates passwords which are entirely irregular. Specifically, the card device 2 generates a password by using unpredictable start information 403 received from the host 1.

The host 1 includes a start information generation program 11 for generating the above unpredictable start information. The host 1 sends the start information 403 output from the start information generation program 11 to a password generation program 21 included in the card device 2. At the same time, the host 1 causes a password generation program 12 (see FIG. 2) also built therein to generated a password. The host 1 causes the password generation program 11 to generate start information 403 based on unpredictable information while preventing the program 11 from outputting the same start information 403 twice or more. When a channel is set up between the card device 2 and the host 1, the program 21 of the card device 2 generates a password 401 on the basis of the start information received from the host 1. The password 401 is sent from the card device 2 to the host 1 for certification. If the password received from the card device 2 is identical with the password generated in the host 1, the host 1 certifies it and allows the card device 2 to hold encryption communication therewith. If the received password is different from the password generated in the host 1, the host 1 rejects encryption the communication.

When the password 401 sent from the card device 2 to the host 1 is certified, the card device 2 encrypts plain text data 411 and sends the resulting text data 405 to the host 1. At this instant, the card device 2 uses an encrypting method entirely new in the art. Specifically, the card device 2 additionally includes a data encryption 22 for executing time-varying irregular control. The data encryption 22 controls a plurality of different encryption programs in a sophisticated manner so as to execute the time-varying irregular control. The encrypted text data 405 are sent to the host 1. A decryption circuit 14, shown in FIG. 2, is included in the host 1 and decrypts the received text data so as to reconstruct the plain text data 413.

Figure 2:
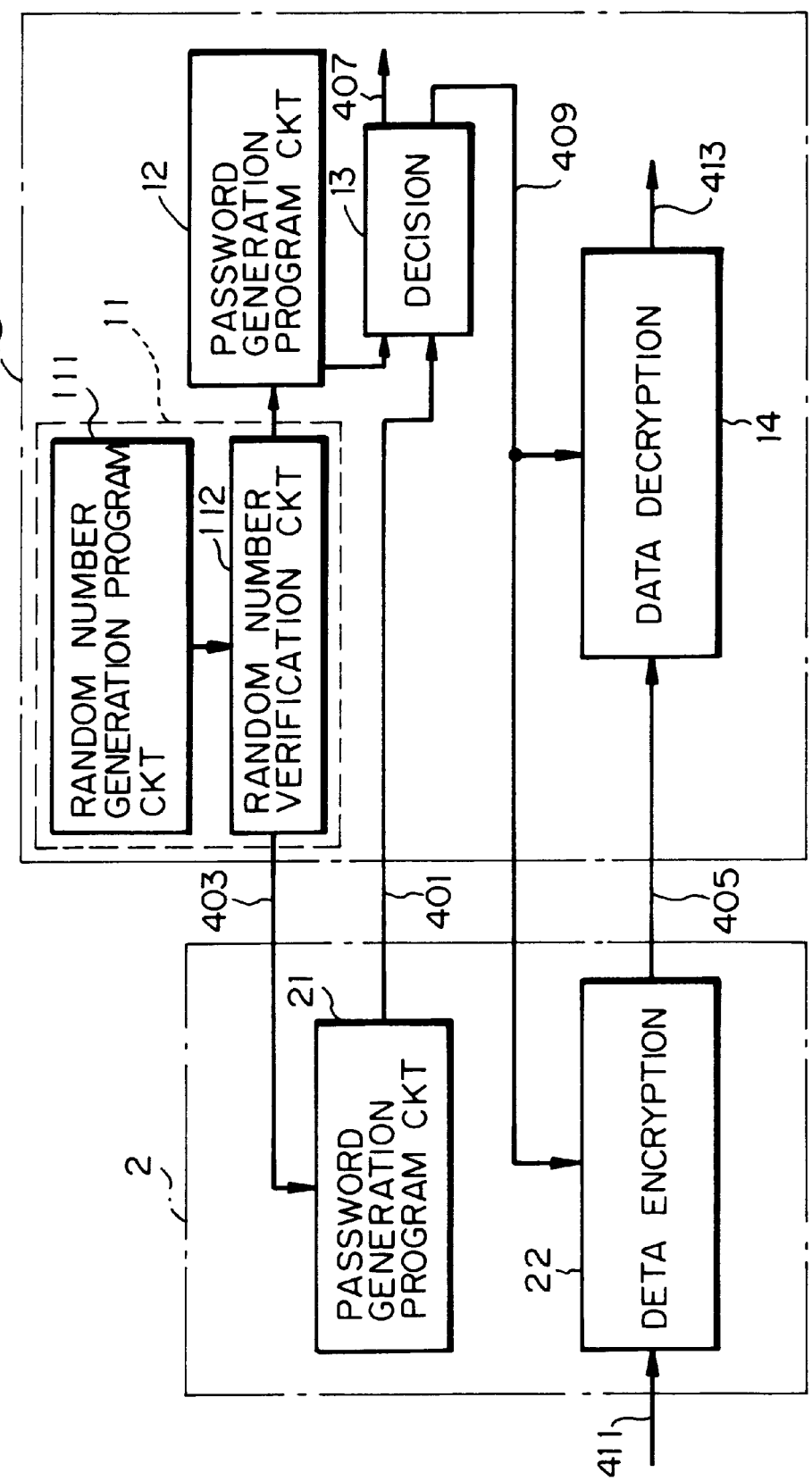
FIG. 2 is a block diagram schematically showing a specific configuration included in the embodiment for generating a password, together with an encryption procedure and a decryption procedure based on the certification of the password.

Reference will be made to FIG. 2 for describing a specific configuration for generating the password and the encryption and decryption procedures based on the certification. As shown, the host 1 has, in addition to the start information generation program 11 and a password generation program 12, a decision 13, and a data decryption 14 for decrypting encrypted data by time-varying irregular control. The start information generation program 11 is made up of a random number generation program circuit 111 and a random number verification program circuit 112. The random number generation program circuit 111 generates unpredictable random numbers by program processing and then generates, based on the random numbers, password generation start information in the form of a preselected block having a preselected number of bits. The random number verification program circuit 112 determines, by program processing, whether or not the above start information has been used in the past. If the start information is new, the program circuit 112 delivers the start information to the password generation program 12 as valid start information. At the same time, the program circuit 112 sends the start information 403 to the password generation program 21 of the card device 2.

The password generation programs 12 and 21 each use the start information as information (agreement) for constructing a logic circuit for the generation of random numbers. The logic circuit may be an M sequence (Maximum length shift register sequence) by way of example. In addition, the programs 12 and 21 each use the start information as initial data (initial value) with which the above logic circuit generates random numbers. The two programs 12 and 21 are identical in configuration with each other and output an identical password when provided with identical start information. It is therefore possible to determine whether or not the password 401 generated by the card device 2 is identical with the password generated by the host 1.

Specifically, when the password generation program 21 of the card device 2 receives the start information 403 from the host 1, it constructs a logic circuit for the generation of random numbers by using a random number generation program in accordance with the start information. Further, the program 21 sets initial data and generates random numbers with the logic circuit. The program 21 selects a predetermined number of bits out of the resulting random number sequence and sends them to the decision 13 of the host 1 as a password.

In the host 1, the password generation program 12 also constructs a logic circuit for the generation of random numbers in accordance with the start information and by using the same random number generation program as the program circuit 21 of the card device 2. Then, the program 12 sets initial data and generates random numbers with the logic circuit. The program 12 selects a preselected number of bits out of the resulting random number sequence and delivers them to the decision 13 as a password.

The decision 13 compares the password 401 received from the card device 2 and the password output from the program 12 to see if they are identical or not. If the two passwords are not identical, the host 1 does not accept the access from the card device 2 to produce a non-coincidence signal 407. If the two passwords are coincident, the host 2 sends a coincidence signal 409 to the data encryption 22 of the card device 2. The data encryption circuit 22 executes time-varying irregular control, as will be described specifically later. In response to the coincidence signal, the data encryption 22 starts encrypting plain text data 411. The coincidence signal 409 output from the decision 13 is applied to the data decryption 14 of the host 1 also, causing it to start decrypting the encrypted text data 405.

In the above construction, even if an unauthorized person succeeds to steal the password generation start information 403 between the card device 2 and the host 1, the person cannot generate a password identical with the password generated within the host 1 unless the person is informed of the password generating method of the password generation program 21. Further, even if the unauthorized person steals a password 401 and tries to access the host 1 with the password, the decision 1 of the host determines that the stolen password is not acceptable. This is because the host 1 generates an unpredictable password every time the card device 2 is connected to the host 1.

Although an unauthorized person may steal both of password generation start information and a password associated therewith, it is extremely difficult for the person to deduce a causal relation between the password and the start information for the following reason. The password generation program 21 of the card device 2 constructs a logic circuit for the generation of random numbers on the basis of a part of the password generation start information. The logic circuit sets initial data in the logic circuit by using another part of the start information, and then generates random numbers. As a result, a new logic circuit is constructed every time the start information is varied, producing entirely new random numbers. It is therefore extremely difficult and prohibitively time-consuming for an unauthorized person to guess regularity.

It may occur that the card device 2 and therefore the program of the password generation program 21 is stolen. In light of this, the host 1 should preferably be capable of managing a serial number given to the individual card device 2. When the card device 2 is stolen, the host 2 with such a capability erases the serial number of the card device 2 registered thereat. When a channel is set up between the stolen card device 2 and the host 1 afterwards, the host 1 commands the card device 2 to send its serial number to the host 1. Because the serial number of the stolen card device 2 has been erased, the host 1 does not send start information for the generation of a password to the card device 2.

Figure 3:
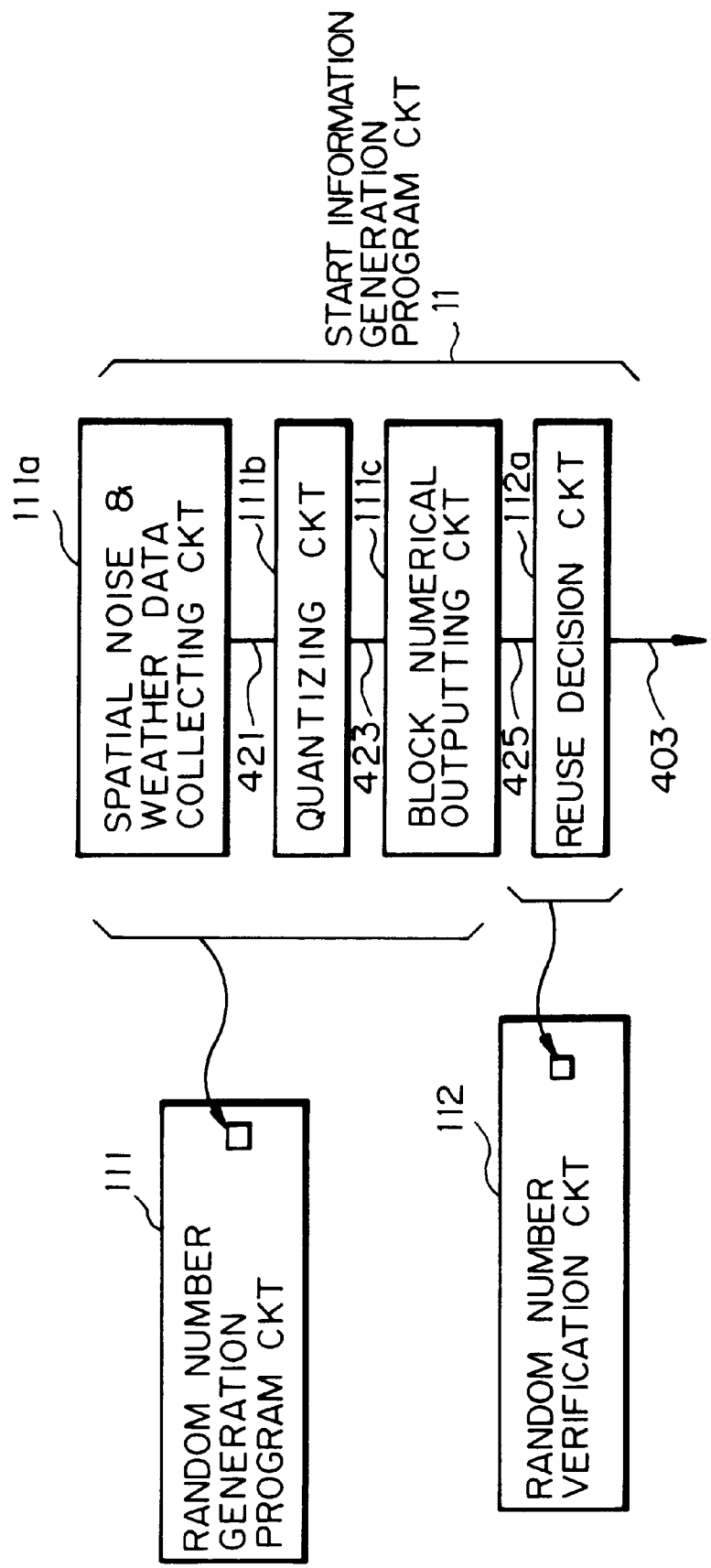
FIG. 3 is a block diagram schematically showing a specific configuration of a random number generation program circuit and a random number verification program circuit constituting a start information generation program circuit included in the embodiment.

FIG. 3 shows a specific configuration of the random number generation program circuit 111 and random number verification program circuit 112 included in the start information generation program 11. In FIG. 3, the random number generation program circuit 111 generates random numbers for start information 403 by using a signal derived from natural phenomena. As shown, the circuit 111 is made up of a spatial noise and weather data collecting circuit 111a, a quantizing circuit 111b, and a block numerical outputting circuit 111c. In the illustrative embodiment, the spatial noise and weather data collecting circuit 111a catches spatial noise in the form of an electromagnetic wave signal with a simple antenna and outputs a spatial noise signal. Spatial noise is desirable because its amplitude varies in the same manner as natural random numbers having no periodicity. In addition, changes in temperature and humidity are similar to natural random numbers because they also change in an unpredictable way. Sensors, not shown, responsive to the varying temperature and humidity are included in the collecting circuit 111a. The collecting circuit 111a feeds the spatial noise signal and the outputs of the sensors representative of the instantaneous temperature and humidity, i.e., weather data to the quantizing circuit 111b, as shown by a connection 421.

The quantizing circuit 111b quantizes the input spatial noise signal and weather data 421 and outputs corresponding digital signals 423. The block numerical outputting circuit 111c transforms the digital signals to blocks of numerical values and thereby outputs temporary password generation start information 425. This information consists of a block of information for constructing a logic circuit for password generation and a block of initial value data. The temporary password generation start information is fed from the circuit 111c to the random number verification program circuit 112.

The random number verification program circuit 112 examines the temporary start information 425 received from the block numerical outputting circuit 111c. If the temporary start information is adequate, the program circuit 112 outputs it as valid password generation start information 403 to be actually used. Specifically, the program circuit 112 has a reuse decision circuit 112a for determining whether or not the temporary start information has been used in the past. Only if the temporary start information has not been used in the past, the reuse decision circuit 112a outputs it as valid password generation start information. This start information is stored in the host 1 for the verification of start information which will occur in the future.

Figure 4:
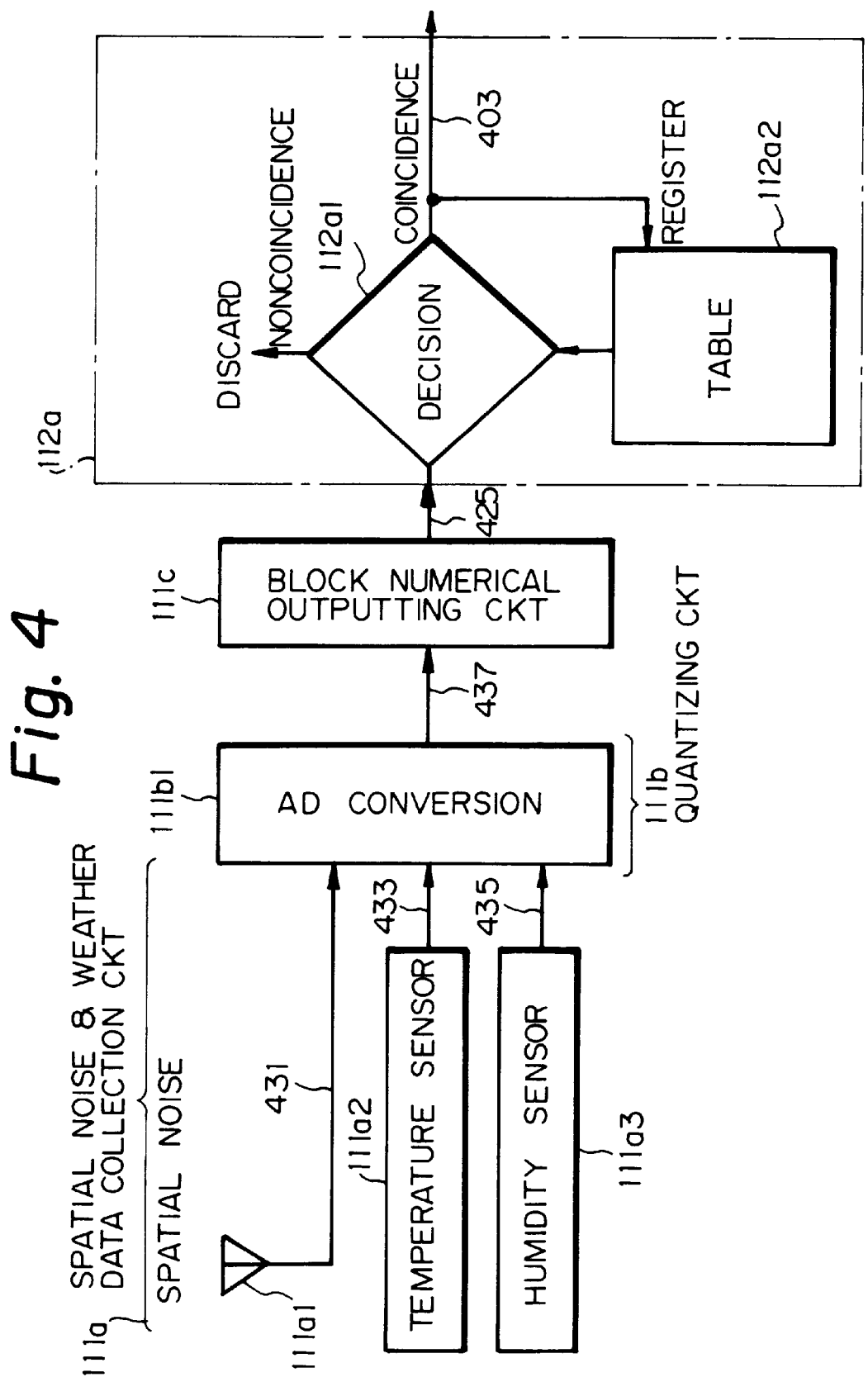
FIG. 4 is a block diagram schematically showing a more specific configuration of the start information generation program circuit.

A more specific configuration of the start information generation program 11 shown in FIG. 3 will be described with reference to FIG. 4. As shown, the program 11 includes an antenna 111a1 for capturing spatial noise and feeding the resulting spatial noise signal 431 to an analog-to-digital converter (ADC) 111b1 included in the quantizing circuit 111b. A temperature sensor 111a2 senses temperature around the host 1 and transforms it to an electric temperature signal 433. A humidity sensor 111a3 senses humidity around the host 1 and transforms it to an electric humidity signal 435. The temperature signal 433 and humidity signal 435 output from the sensors 111a2 and 111a3, respectively, are fed to the ADC 111b1.

The ADC 111b1 converts the spatial noise signal, temperature signal and humidity signal to a digital signal 437 having, e.g., twenty bits for a sample. With the twenty-bit digital signal, it is possible to produce $2^{20}$ (=1,048,576) different combinations. The digital signal 437 output from the ADC 111b1 and having a word length of twenty bits for a sample is delivered to the block numerical outputting circuit 111c and transformed to temporary password generation start information 425 thereby. Specifically, ten bits of the twenty bits may be used as information for constructing a logic circuit for the generation of random numbers, in which case the other ten bits will be used as initial value data. If desired, $\alpha$ bits (random numbers) may be added to the above twenty bits.

The temporary start information 425 output from the block numerical outputting circuit 111c is fed to a coincidence decision circuit 112a1 included in the reuse decision circuit 112a. An information table 112a2 lists password generation start information enerated and output in the past. The coincidence decision circuit 112a1 references the information table 112a2 in order to determine whether or not the temporary start information 425 received from the block numerical outputting circuit 111c coincides with any one of the past information listed in the table 112a2. if the answer of this decision is positive, the temporary start information is discarded and not used for the generation of a password. If the answer of the above decision is negative, the decision 112a1 determines that the temporary start information has not been used in the past. Then, the decision circuit 112a1 outputs the temporary start information as valid start information 403 and registers it at the information table 112a2, so that the valid start information will not be used in the future.

Figure 5:
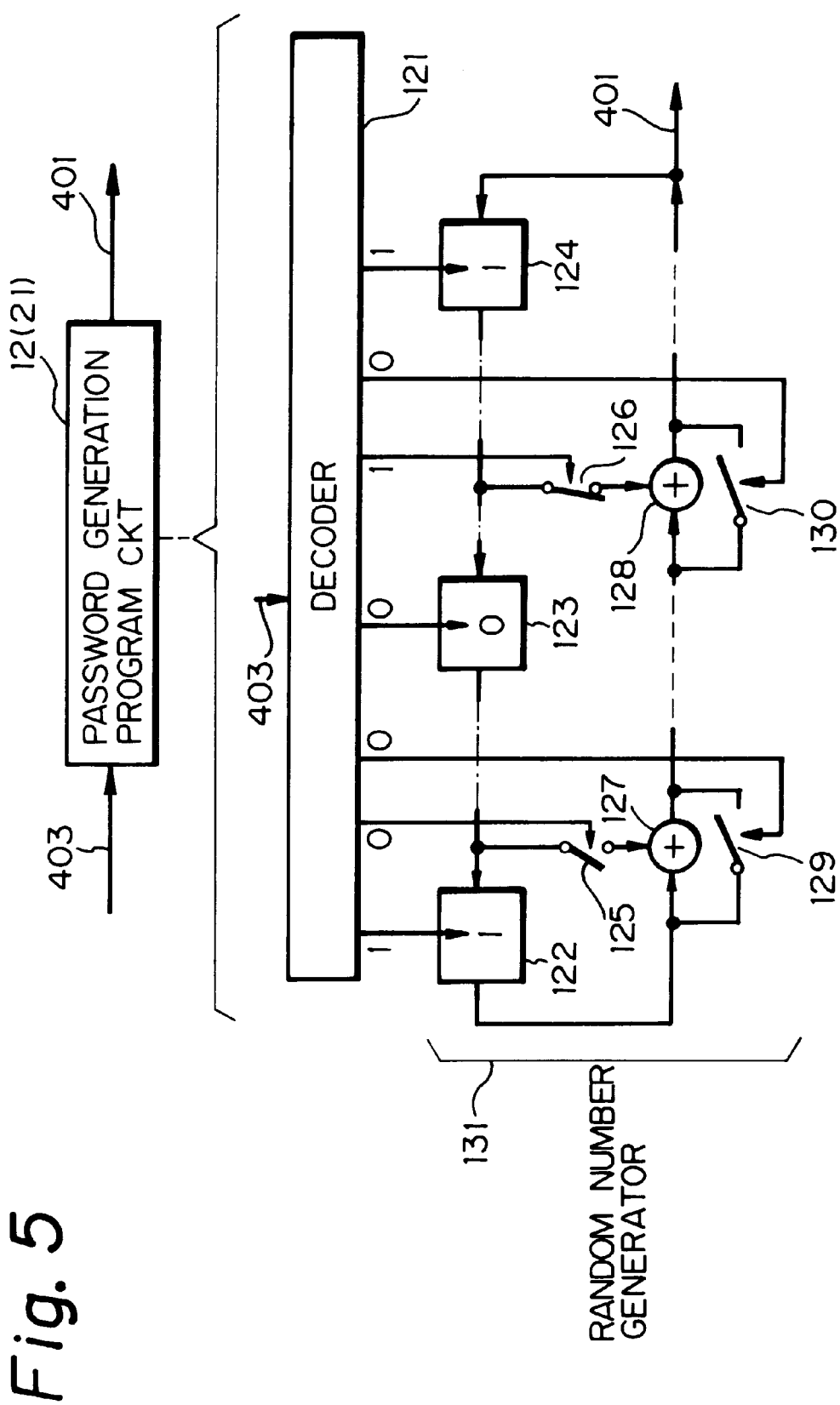
FIG. 5 is a block diagram schematically showing a specific configuration of a password generation program circuit included in each of a data terminal card device and a host constituting the embodiment.

FIG. 5 shows a specific configuration of the password generation program circuit 21 of the card device 2 or the password generation program circuit 12 of the host 1. As shown, the program circuit 12 or 21 is generally made up of a decoder 121 and a random number generator 131. Upon receiving the password generation start information 403, the decoder 121 decodes the information and then separates the decoded information into data (e.g. "0010") for defining a logic circuit configuration meant for the random number generator 131 and initial data (e.g. "101"). This data are fed from the decoder 121 to the random number generator 131.

The random number generator 131 is an N stage, M sequence generating circuit made up of shift registers 122–124, switches 125, 126, 129 and 130, and Ex-OR (Exclusive-OR) gates 127 and 128. The data defining a logic circuit configuration selectively turns on or turns off the switches 125, 126, 129 and 130. Specifically, assuming that the above data is "0010", as shown in FIG. 5, then an output "0" of the decoder 121 turns off the switch 125 and thereby disconnects the input of the shift register 122 and that of the Ex-OR gate 127. This, coupled with the fact that another output "0" of the decoder 121 tuns off the switch 129, renders the Ex-OR gate 127 operable. Likewise, another output "1" of the decoder 121 turns on the switch 126 and thereby connects the input of the shift register 123 and that of the Ex-OR gate 128 while another output "0" of the decoder 121 turns off the switch 130. The Ex-OR gate 128 is therefore held operable.

Assume that the initial data output from the decoder 121 are "101", as shown in FIG. 5. Then, the data "1" is set in each of the shift registers 122 and 124 as a part of the initial data while the data "0" is set in the shift register 123 as the other part of the initial data.

With the above logic circuit configuration and initial data, the random number generator 131 is capable of outputting an M sequence, pseudo random number sequence having a length of $2^n-2$ (n being the number of shift register stages) via the output of the Ex-OR gate 130. A predetermined number of bits of the pseudo random number sequence, e.g., twenty bits (five figures in hexadecimal notation) may be used as a password. This allows any one of $2^{20}=1,048,576$ different passwords in total to be used.

As stated above, when the bit arrangement of the password generation start information is varied, the logic circuit configuration of the random number generator 131 and the initial data set in the shift registers of the generator 131 are varied. As a result, a random number sequence having no causal relation can be generated, allowing a password to have a variable bit arrangement. It follows that an unauthorized person cannot predict a password from the password generation start information unless the person deduces the decoding method of the decoder 121 from the start information. The decoding method of the decoder 121 refers to, e.g., how many bits of the start information are allocated to the initial data and how many bits of the same are allocated to the logic circuit configuration. Therefore, the illicit prediction of the password by the third party can be obviated because the decoding method is varied.

Figure 6:
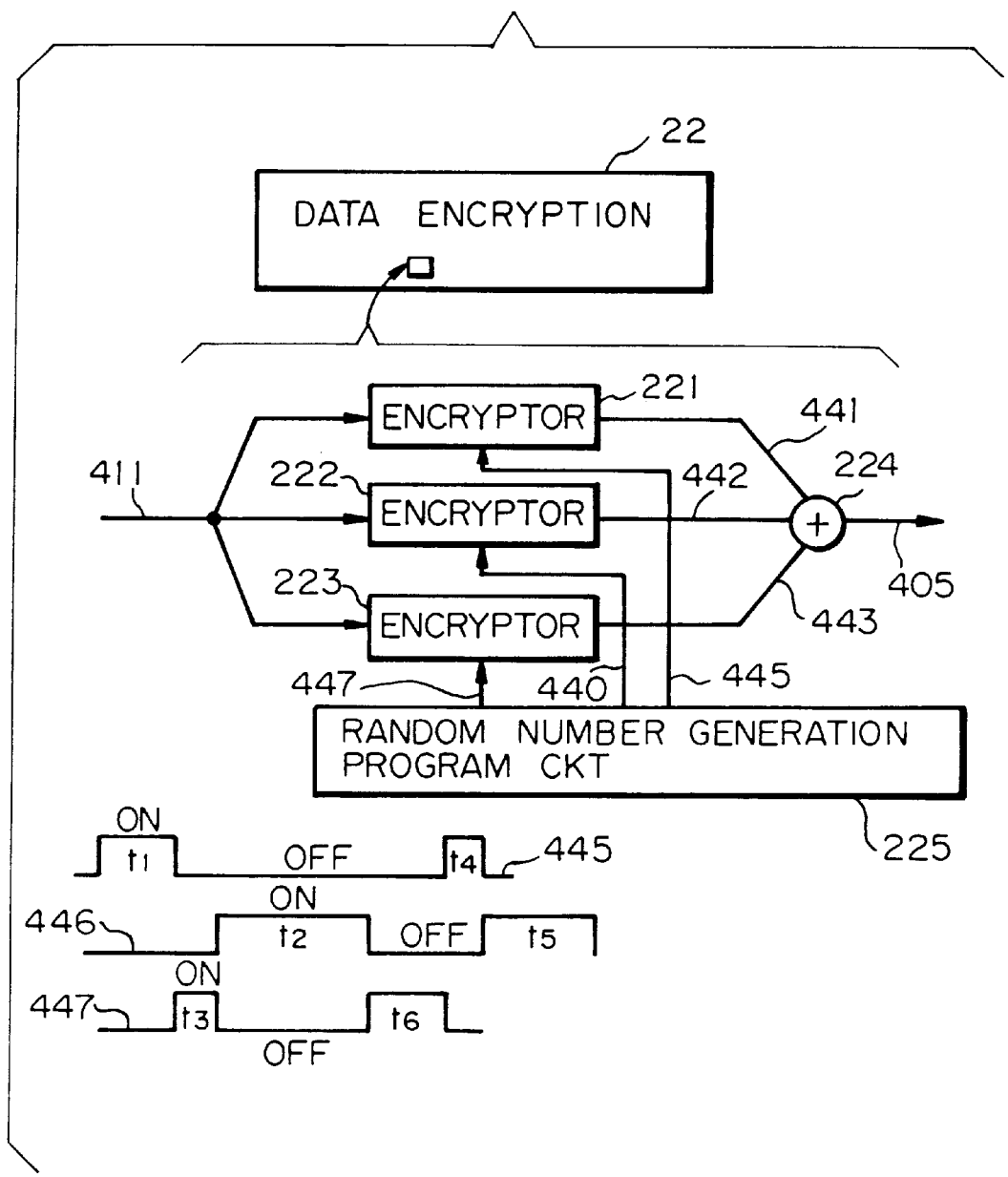
FIG. 6 is a block diagram schematically showing a specific configuration of a data encryption circuit also included in the embodiment.

Reference will be made to FIG. 6 for describing a specific configuration of the data encryption 22 of the card device 2 which executes time-varying irregular control. As shown, the data encryption 22 has encryptors 221–223, a combiner 224, and a random number generation program circuit 225. The encryptors 221–223 each encrypts plain text data 411 with a particular random number generating circuit. The combiner 224 combines encrypted data 441–443 output from the encryptors 221–223 and outputs the combined data 405. The random number generation program circuit 225 includes a random number generator and selectively causes any one of the encryptors 221–223 to operate irregularly with the elapse of time by control signals 445–447.

For example, the above program circuit 225 causes the encryptor 221 to operate for periods of time of t1 and t4, causes the encryptor 222 to operate for periods of time of t2 and t5, and causes the encryptor 223 to operate for periods of time of t3 and t6; the periods of time t1, t2 and t3 are different from each other, and so are the periods of time t4, t5 and t6. This kind of control allows the encryptors 221–223 to be selected and operated irregularly, thus implementing entirely new sophisticated encryption. The decrypting side will be provided with a random number generation program for executing control inverse to the time-varying irregular control of the program circuit 225, so as to decrypt the encrypted data 405.

Figure 7:
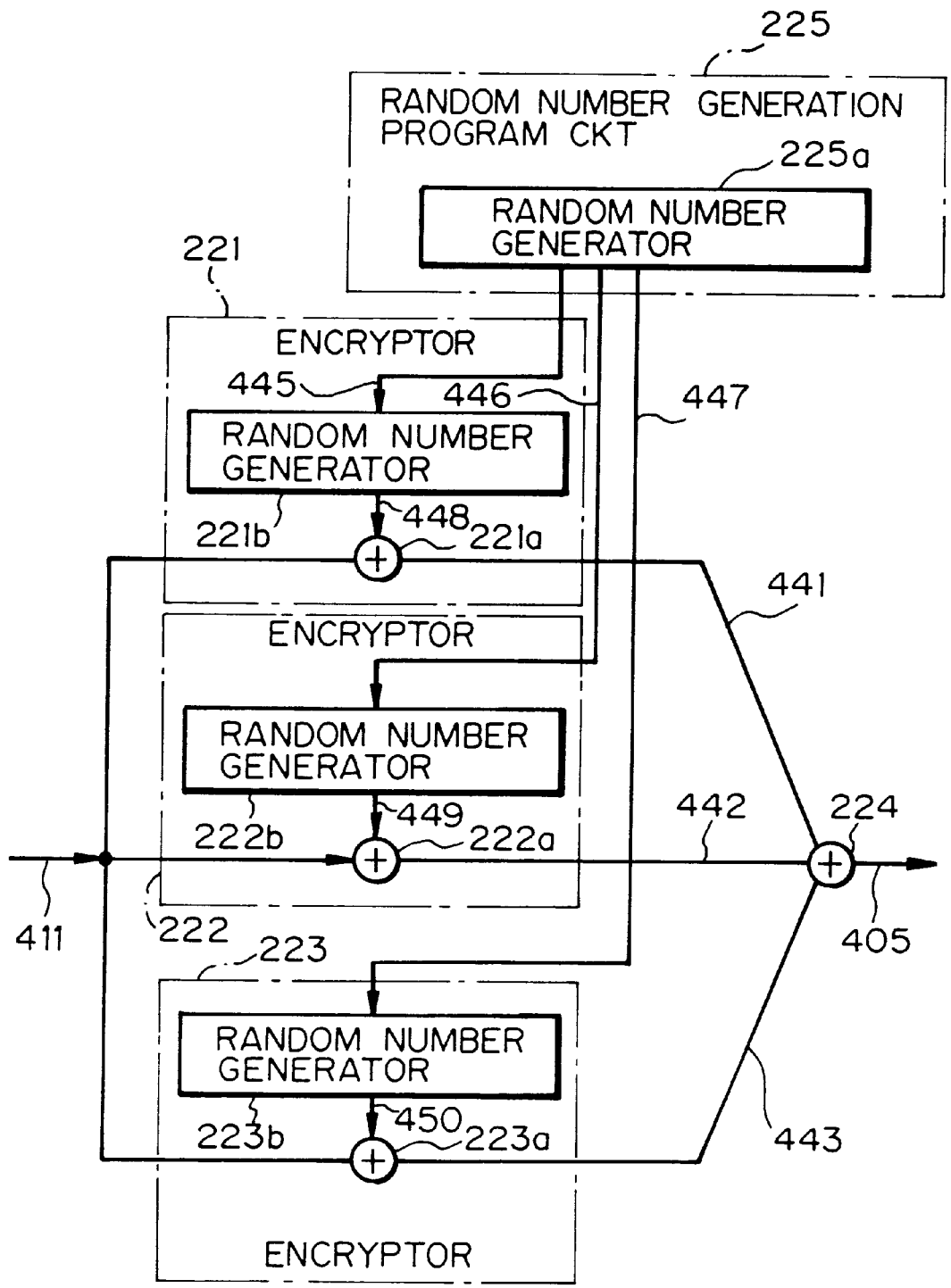
FIG. 7 is a block diagram schematically showing a more specific configuration of the data encryption circuit.

A more specific configuration of the data encryption 22 of FIG. 6 is shown in FIG. 7. As shown, the encryptor 221 has a random number generator 221b and an Ex-OR gate 221a. The Ex-OR gate 221a encrypts plain text data 411 by using a random number sequence 448 output from the random number generator 221b. The random number generation program circuit 225 includes a random number generator 225a. The random number generator 221b is caused to operate for, e.g., the periods of time t1 and t4 shown in FIG. 6 by random numbers 445 output from the random number generator 225a.

The encryptor 222 has a random number generator 222b and an Ex-OR gate 222a and causes the Ex-OR gate 222a to encrypt plain text data 411 with a random number sequence 449 output from the generator 222b. The random number generator 222b is caused to operate, for, e.g., for the periods of time t2 and t5 shown in FIG. 6, by random numbers 446 output from the random number generator 225a. Further, in the encryptor 223, an Ex-OR gate 223a encrypts plain text data 411 with a random number sequence 450 output from a random number generator 223b. The random number generator 223b is caused to operate, e.g., for the periods of time t3 and t6 shown in FIG. 6, by random numbers 447 output from the random number generator 225a.

The random number generators 221b, 222b and 223b each operates with a particular random number generating method and a particular random number period and may therefore be implemented by the random number generator 131 shown in FIG. 5. The random number generator 225 included in the program circuit 225 may include a random number generator and a timing signal generator for outputting control signals 445–447 shown in FIG. 6.

Figure 8A:
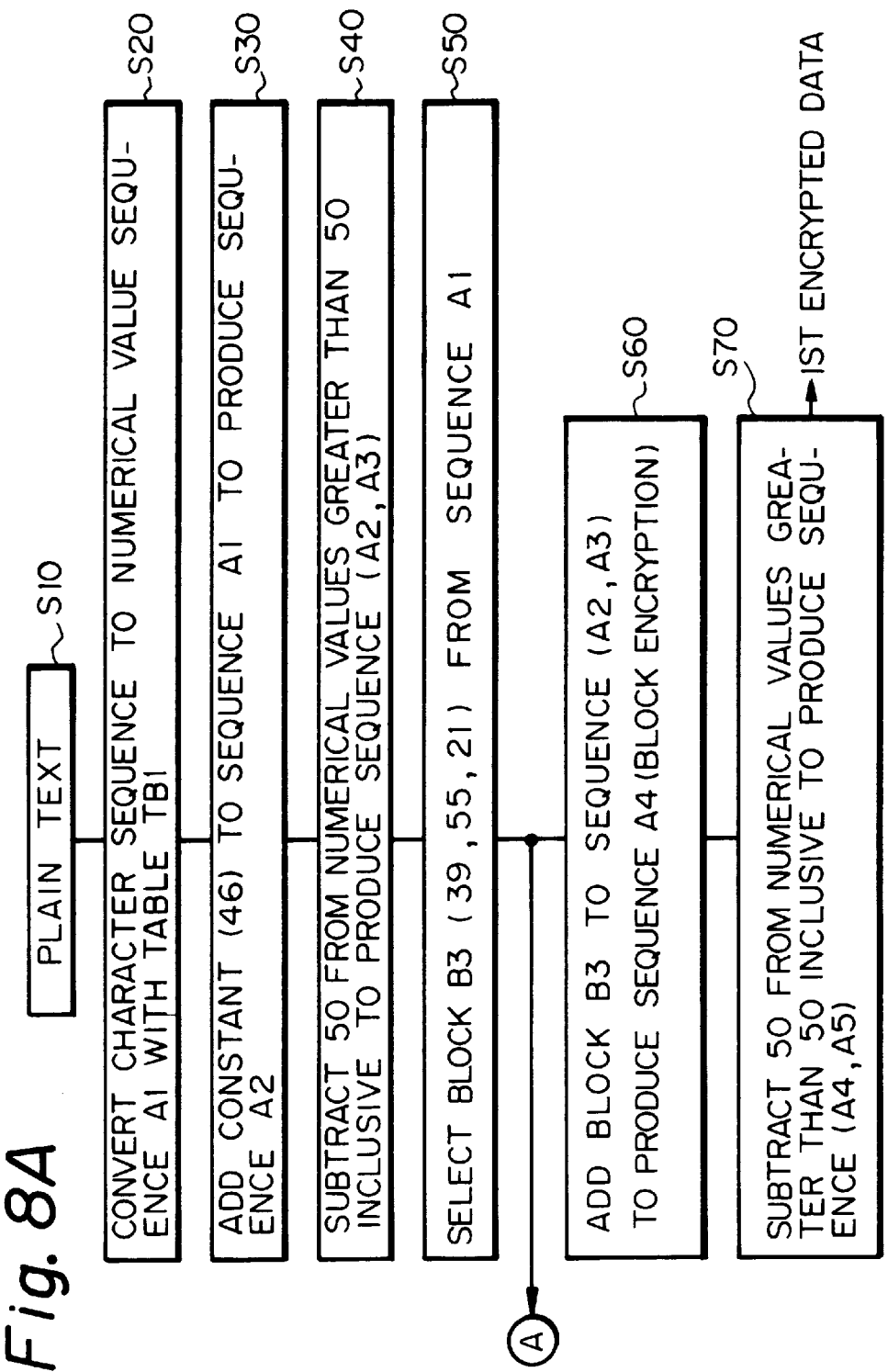

Another specific procedure for encrypting plain text data will be described with reference to FIGS. 8A and 8B. Assume that a plain text in step S10 is a sequence of Japanese characters (hiragana) pronounced as "ho-n-ji-tsu-wa-se-i-te-n-na-ri". Each syllable corresponds to one Japanese character or hiragana. FIGS. 9A and 9B show a specific character-to-numeral value conversion table TB1. The procedure begins with the step of converting the above plain text data to a numerical value sequence A1 (step S20) by use of the conversion table TB1. As a result, as shown in FIG. 10, (a), the character sequence "ho-n-ji-tsu-wa-se-i-te-n-nari" is replaced with a sequence of numerical values "39, 55, 21, 56, 35, 23, 11, 28, 55, 30, 49".

Subsequently, a certain constant, e.g., 46 is added to each of the numerical values A1 so as to produce a sequence of numerical values A2 (step S30). As shown in FIG. 10, (b), the addition produces a sequence of numerical values "85, 101, 67, 102, 81, 69, 57, 74, 101, 76, 95". If desired, the above constant 46 may be varied irregularly by control using an encryption program.

To limit the number of digits of the numerical value A2 to two, 50 is subtracted from the numerical values A2 greater than 50 inclusive. As a result, a sequence of numerical values (A2, A3) "35, 51, 17, 52, 31, 19, 7, 24, 51, 26, 45" are produced, as shown in FIG. 10, (c) (step S40). If desired, the value 50 to be subtracted may be varied by use of a random number table, or values listed in the random number table may be raised to a suitable power.

Thereafter, a particular leading block B3 (39, 55, 21) is selected from the original sequence of numerical values A1 (step S50). The numerical values "39", "55" and "21" constituting the block B3 are respectively added to the leading three numerical values of the sequence (A2, A3), i.e., "35", "51" and "17". This is repeated with all the other numerical values of the sequence (A2, A3), three numerical values at a time, by sequentially shifting the block B3 so as to produce a sequence of numerical values A4 (step S60). The resulting sequence A4 is "74, 106, 38, 91, 86, 40, 46, 79, 72, 65, 100", as shown in FIG. 10, (d). Stated another way, block encryption is executed with every three numerical characters of the sequence (A2, A3). If desired, the numerical values "39", "55" and "21 of the block B3 may be varied on the basis of an encryption program, or the length of the block B3 may be varied.

Again, 50 is subtracted from the numerical values of the above sequence A4 which are grater than 50 inclusive, thereby producing a sequence numerical values (A4, A5) (step S70). As shown in FIG. 10, (e), the resulting sequence (A4, A5) is "24, 56, 38, 41, 36, 40, 46, 29, 22, 15, 50". The sequence (A4, A5) may be output as first encrypted data. The value 50 to be subtracted from the sequence A4 may be varied by use of a random number table, or the values of the random number table may be raised to a suitable power, as desired.

Further, on the elapse of, e.g., 1 second, one of the consecutive blocks B3 (39, 55, 21) selected in the step S50 is shifted irregularly. The resulting sequence of numerical values are, e.g., "21, 39, 55, 39, 55, 21, 39, 55, 21, 39, 55", as shown in FIG. 11, (b). These numerical values or shift blocks SF (step S80) are respectively added to the sequence of numerical values (A2, A3) produced in the step S40 and shown in FIG. 11, (a). As a result, a sequence of numerical values A6 "56, 90, 72, 91, 86, 40, 46, 79, 72, 95, 100" are produced (step S90).

A value 50 is subtracted from the numerical values of the above sequence A6 which are greater than 50 inclusive. This produces a sequence of numerical values (A6, A7) "6, 40, 22, 41, 36, 40, 46, 29, 22, 45, 50", as shown in FIG. 11, (d) (step S100). This sequence (A6, A7) may be output as a second encrypted data. If desired, the value 50 to be subtracted may be varied by use of a random number table, or the values of the random number table may be raised to a suitable power.

Assume that N shift blocks SF are shifted on the elapse of N seconds, and the resulting sequence "N . . . N, 39, 55, 21, 39, 55, 21, 39" is added to the sequence (A2, A3) of FIG. 11, (a), as shown in FIG. 11, (e). Then, there is produced a sequence A8 "XN . . . ZN, 70, 74, 28, 63, 106, 47, 84", as shown in FIG. 11, (f). The value 50 is subtracted from the numerical values of the above sequence A8 which are greater than 50 inclusive. This produces a sequence "XN . . . ZN, 20, 24, 28, 13, 56, 47, 34" shown in FIG. 11, (g). This sequence may be output as the N-th encrypted data. If desired, the value 50 to be subtracted may be varied by use of a random number table, or the values of the random number table may be raised to a suitable power.

The decrypting side decodes the first to N-th encrypted data by executing a procedure inverse to the encryption procedure. For this purpose, the decrypting side also uses the conversion table shown in FIGS. 9A and 9B and starts an inverse processing program. The decryption procedure is synchronized to the encryption procedure.

Preferably, a first and a second computer made an agreement on communication, each downloads an encryption program and a program representative of the dynamic encryption variation rule, and starts the encryption program by using the time of downloading as a reference. The numerical values which are the keys of encryption are sequentially varied at all times.

For more sophisticated encryption, data may be multiplied and then raised to a suitable power, in such a case, decryption will be implemented by an inverse cube root. Alternatively, a plain text may be encrypted by keys equal in number to the characters constituting the text.

The interval (e.g. seconds) between the consecutive variations is random and varied irregularly by use of, e.g., numerical values listed in a random number table. Further, the individual numerical value of the random number table is raised to a suitable power and used as the above interval on a preselected unit basis, and in addition used to multiply the numerical values or keys of encryption. That is, for multiplying numerical values, the time variation selected from the random number table and the keys of an encrypted text should preferably be held in unison with each other.

The encryption procedure and decryption procedure can be synchronized to each other if the time of the first computer and that of the second computer are matched. For example, as shown in FIG. 12, encryption communication is implemented if the encrypted data of the first computer and those of the second computer are matched while being synchronized to the elapse of time. Even if a third computer succeeds to decrypt any one of the encrypted data shown in FIG. 12, it cannot use the decrypted data because the data will have already been replaced with another encrypted data.

Figure 13:
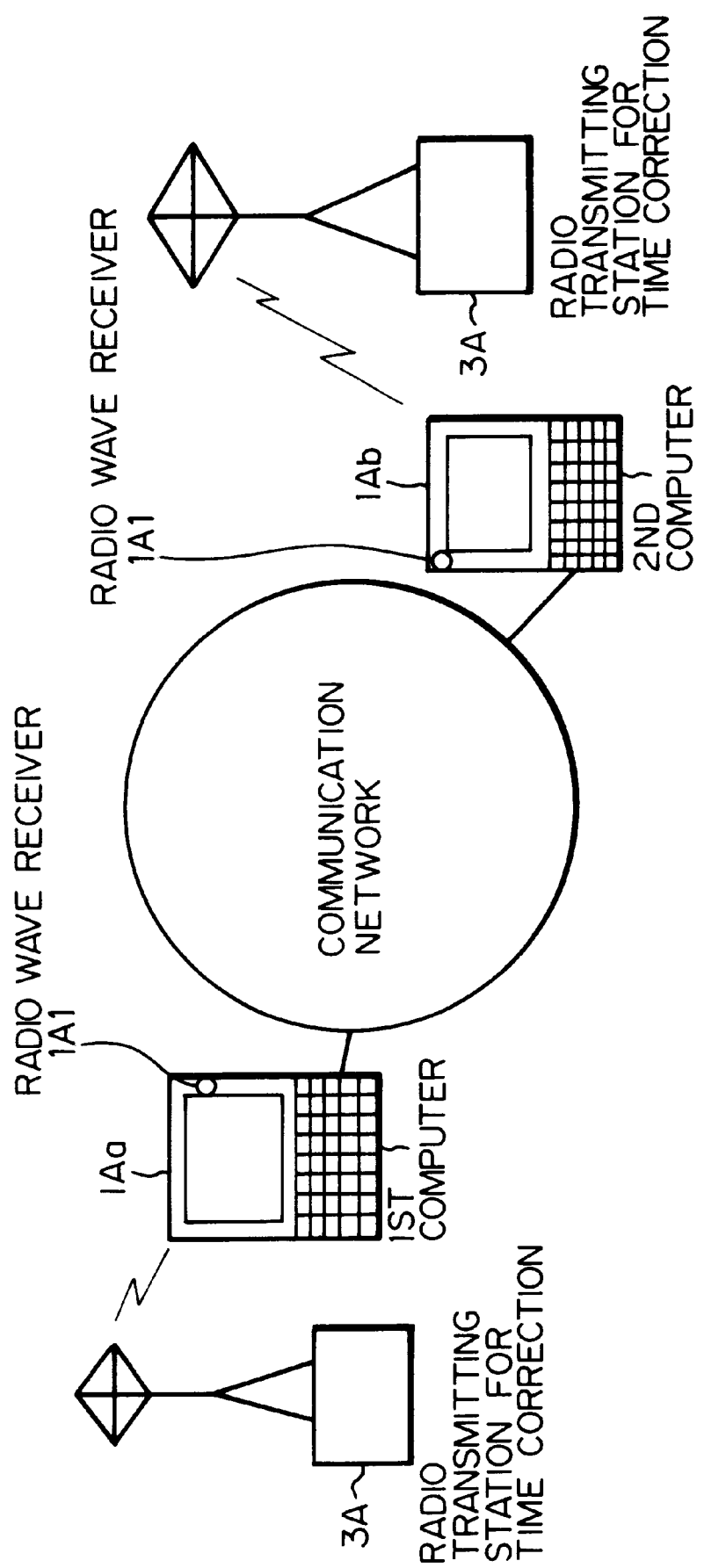
FIG. 13 shows a specific system configuration for allowing the first and second computers to match their times by receiving a reference radio wave for correction from a radio wave transmitting station.

FIG. 13 shows a specific implementation for matching the time of a first computer and that of a second computer expected to hold encryption communication. As shown, a first and a second computer 1Aa and 1Ab, respectively, is provided with a reference wave receiver 1A1 for receiving a reference radio wave being emitted from a transmitting station 3A adapted for time correction or a GPS satellite. In Japan, for example, the reference wave receiver 1A1 may periodically receive a reference radio wave derived from an atomic clock (error of 1 second for 300,000 years) controlled by Japanese Ministry of Posts and Telecommunications. This reference wave may be used to correct the timepiece of the individual computer so as to correct any error in the periodic variation of the decoded data. FIG. 14 shows a more specific system configuration for achieving the above object. As shown, a data terminal card device 2A includes an antenna C1, a radio wave receiver C2, a RAM (Random Access Memory) or work area C4, a flash memory C5, a programmable ROM (Read Only Memory) C6, a power supply C7, a timepiece C8, an outside connection circuit C9, a display 10, and a CPU (Central Processing Unit) C11.

The antenna C1 and radio wave receiver C2 should preferably receive a reference radio wave signal from a radio wave transmitting station 11 for data time correction, putting the timepiece C8 right at all times. The flash memory C5 should preferably store a password generation program, an encryption program, and a communication program for communicating with other devices.

When the timepiece C8 is slow and brings data out of order, the variation of encrypted data up to the correct time is determined by high speed computation in order to advance the numerical values for encryption to those of the correct time. For example, when the timepiece C8 is fast, the numerical values will be corrected to the numerical values of the correct time by a program.

When the card device 2A is powered by a battery, it may occur that the device 2A fails to receive the radio wave due to the consumption of the battery and introduces an error in the timepiece C8. In light of this, the time and numerical values for encryption occurred at the time of the last receipt of the radio wave may be stored in a flash memory or similar semiconductor memory capable of storing data without resorting to a battery. Then, when the card device 2A is again enabled to receive the radio wave, high speed computation is executed by the encryption algorithm of the card device 2A on the basis of the time of recovery so as to advance the numerical values to those of the correct time.

In computer communication, data security is a question of vital interest due to the advance of network communication. Security available today is too loose to put an end to the illicit use of telephone cards, pachinko cards and other data despite various remedies proposed in the past. A static (uniform and simple) encryption system involve factors which will be decoded by an unauthorized person in the future. By contrast, a dynamically varying security system makes it impractical for an unauthorized person illicitly obtained encrypted data to decrypt them because the encrypting method varies every moment.

Even if an unauthorized person decodes the variation rule of the encrypting method, the person cannot find the start time and therefore when the encryption keys derived the encrypted data were used. Although the unauthorized person may decode the numerical values of a certain time, the person cannot detect the numerical values indicative of the time-varying rule or the encryption rule because the numerical values vary every moment. This successfully protects a computer network system from illicit use and contributes a great deal to the advance of sound computer data communication.

In summary, in an encryption communication system of the present invention, a first communication device produces significant information for generating an unpredictable password which varies at each time of connection for communication. A second communication device generates, based on the above information, a password and sends it to the first communication device. If the password is coincident with a password generated in the first communication device, then encryption communication is allowed to be held between the two communication devices. This successfully prevents the password to be illicitly used by an unauthorized person.

Further, plain text data are encrypted by any one of a plurality of different programs selected and varied at an irregular interval on the basis of a time signal or a timing signal designated by a random number generation program for encryption. Therefore, encryption sophisticated enough to keep the text data from the third party is achievable with a simple configuration.

It follows that when data communication is held between computers belonging to an open network or at a data card terminal, utmost data security is ensured and makes it extremely difficult for the third party to illicitly use, e.g., the data card terminal.

The entire disclosure of Japanese patent application No. 129405/1997 filed on May 20, 1997 including the specification, claims, accompanying drawings and abstract of the disclosure is incorporated herein by reference in its entirety.

While the present invention has been described with reference to the illustrative embodiment, it is not to be restricted by the embodiment. It is to be appreciated that those skilled in the art can change or modify the embodiment without departing from the scope and spirit of the present invention.

What is claimed is:

1. An encryption communication system comprising:
   a first communication device for producing significant information for generating a different password at each time of connection for communication; and
   a second communication device for generating, on receiving said information from said first communication device, a password based on said information, and sending said password to said first communication device;
   said first communication device comprising:
      an information producing circuit for producing said information on the basis of an irregular signal;
      a first password generator for generating the password based on said information by using a password generation program;
      a decision circuit for determining whether or not the password received from said second communication device and the password output from said first password generator are coincident, and outputting a coincidence signal if the passwords are coincident or outputting a noncoincidence signal if the passwords are not coincident; and
      a first communication starting circuit for starting encryption communication with said second communication device in response to said coincidence signal;
   said second communication device comprising:
      a second password generator for generating, based on said information received from said first communication device, the password by using a same password generation program as said first password generator; and
      a second communication starting circuit for starting encryption communication with said first communication device in response to said coincidence signal.

2. An encryption communication device comprising:
   an information producing circuit for producing, based on an irregular signal, significant information for generating a password which varies at each time of connection for communication;
   a password generator for generating, based on said information, a password by using a password generation program;
   a decision circuit for determining whether or not a password received from another communication device and the password output from said password generator are coincident, and outputting a coincidence signal if the passwords are coincident or outputting a noncoincidence signal if the passwords are not coincident; and a communication starting circuit for starting encryption communication with the other communication device in response to said coincidence signal.

3. A device in accordance with claim 1, wherein said irregular signal comprises at least one of a noise signal and a weather signal, said password generator digitizing said irregular signal, generating random number data based on resulting digital data, determining whether or not the random number data has been used in the past, and outputting the random number data, if not used in the past, as said information.

4. An encryption communication system comprising:

a first encryption communication device; and a second encryption communication device;

said first encryption communication device comprising:

an information producing circuit for producing, based on an irregular signal, significant information for generating a password which varies at each time of connection for communication;

a first password generator for generating, based on said information, a password by using a password generation program;

a decision circuit for determining whether or not a password received from said second encryption communication device and the password output from said first password generator are coincident, and outputting a coincidence signal if the passwords are coincident or outputting a noncoincidence signal if the passwords are not coincident; and a first communication starting circuit for starting encryption communication with said second encryption communication device in response to said coincidence signal;

said second encryption communication device comprising:

a second password generator for generating, on receiving said information from said first encryption communication device, the password by using a same password generation program as said first password generator; and a second communication starting circuit for starting encryption communication with said first encryption communication device in response to said coincidence signal.

5. An encryption communication system comprising:

a first encryption communication device; and a second encryption communication device;

said first communication device comprising:

an information producing circuit for producing, based on an irregular signal, significant information for generating a password which varies at each time of connection for communication;

a first password generator for generating, based on said information, a password by using a password generation program;

a decision circuit for determining whether or not a password received from said second encryption communication device and the password output from said first password generator are coincident, and outputting a coincidence signal if the passwords are coincident or outputting a noncoincidence signal if the passwords are not coincident; and a first communication starting circuit for starting encryption communication with said second encryption communication device in response to said coincidence signal;

said irregular signal comprising at least one of a noise signal and a weather signal, said first password generator digitizing said irregular signal, generating random number data based on resulting digital data, determining whether or not said random number data has been used in the past, and outputting said random number data, if not used in the past, as said information;

said second encryption communication device comprising:

a second password generator means for generating, on receiving said information from said first encryption communication device, the password by using a same password generation program as said first password generator; and a second communication starting circuit for starting encryption communication with said first encryption communication device in response to said coincidence signal.

6. An encryption communication device comprising:

an encryptor including a plurality of different encryption programs, a random number generation program for encryption, and a timepiece for generating a time signal or a timing signal;

said encryptor selecting, based on said time signal or said timing signal designated by said random number generation program for encryption, one of said plurality of encryption programs at an irregular time interval to thereby encrypt plain text data and outputting resulting encrypted data while selectively varying the encryption program selected.

7. An encryption communication system comprising:

a first encryption communication device; and a second encryption communication device;

said first encryption communication device comprising:

an encryptor including a plurality of different encryption programs, a random number generation program for encryption, and a timepiece for generating a time signal or a timing signal;

said encryptor selecting, based on said time signal or said timing signal designated by said random number generation program for encryption, one of said plurality of encryption programs at an irregular time interval to thereby encrypt plain text data, and outputting resulting encrypted data while selectively varying the encryption program selected;

said second encryption communication device comprising:

a decryptor including a plurality of different encryption programs, a random number generation program for decryption, and a timepiece for generating a time signal or a timing signal;

said decryptor selecting, based on said time signal or said timing signal designated by said random number generation program for decryption, one of said plurality of decryption programs at an irregular time interval to thereby decrypt said plain text data received from said first encryption communication device, and outputting resulting decrypted data while selectively varying the decryption program selected.

8. A recording medium storing a password generation control program for allowing a computer to control generation of a password, wherein said password generation control program causes said computer to produce, based on an irregular signal, significant information for generating a password which varies at each time of connection for communication, to generate said password by using a password generation program, to determine whether or not the password and a password received from another communication device are coincident, and to output a coincidence signal if the passwords are coincident or output a noncoincidence signal if the passwords are not coincident, said password generation control program executing, in response to said coincidence signal, control for starting encryption communication with said other communication device.

9. A recording medium storing a password generation control program for allowing a computer to control generation of a password, wherein said password generation control program causes said computer to receive significant information for generating a password which varies at each time of connection for communication, and to generate a password based on said information by using a password generation program, said password generation control program executing, on receiving a password coincidence signal from another communication device, control for starting encryption communication with said other communication device.

10. A recording medium storing an encryption control program for allowing a computer to control an encrypting device including a plurality of different encryption programs, a random number generation program for encryption, and a timepiece for generating a time signal or a timing signal, wherein said encryption control program causes said computer to select, in response to said time signal or said timing signal designated by said random number generation program, one of said plurality of encryption programs at an irregular time interval and encrypt plain text data while selectively varying the encryption program selected.

11. A recording medium storing a decryption control program for allowing a computer to control a decrypting device including a plurality of different decryption programs, a random number generation program for decryption, and a timepiece for generating a time signal or a timing signal, wherein said decryption control program causes said computer to select, in response to said time signal or said timing signal designated by said random number generation program, one of said plurality of decryption programs at an irregular time interval and decrypt encrypted data while selectively varying the encryption program selected.

12. A method of encryption communicating between a first communication device and a second communication device, comprising the steps of:

producing significant information on the basis of an irregular signal in the first communication device at each time of establishing communication;

generating a password based on the information by using a password generation program in the first communication device;

transmitting the significant information to the second communication device;

generating in the second communication device, based on the information transmitted from the first communication device, a password by using a same password generation program as in the first communication device;

transmitting the password generated in the second communication device to the first communication device;

determining in the first communication device whether or not the password received from the second communication device is coincident with the password generated in the first communication device; and starting encryption communication between the first communication device and the second communication device if the passwords are coincident.

13. A method in accordance with claim 12, further comprising the steps of:

transmitting a coincidence signal to the second communication device if the passwords are coincident in said determining step; and starting encryption communication in the second communication device with the first communication device in response to the coincidence signal received.

* * * * *